Aug. 21, 1923.
A. A. THIELE
1,465,457
POWER DRIVEN LEAD TRUCK
Filed March 10, 1920  3 Sheets-Sheet 2
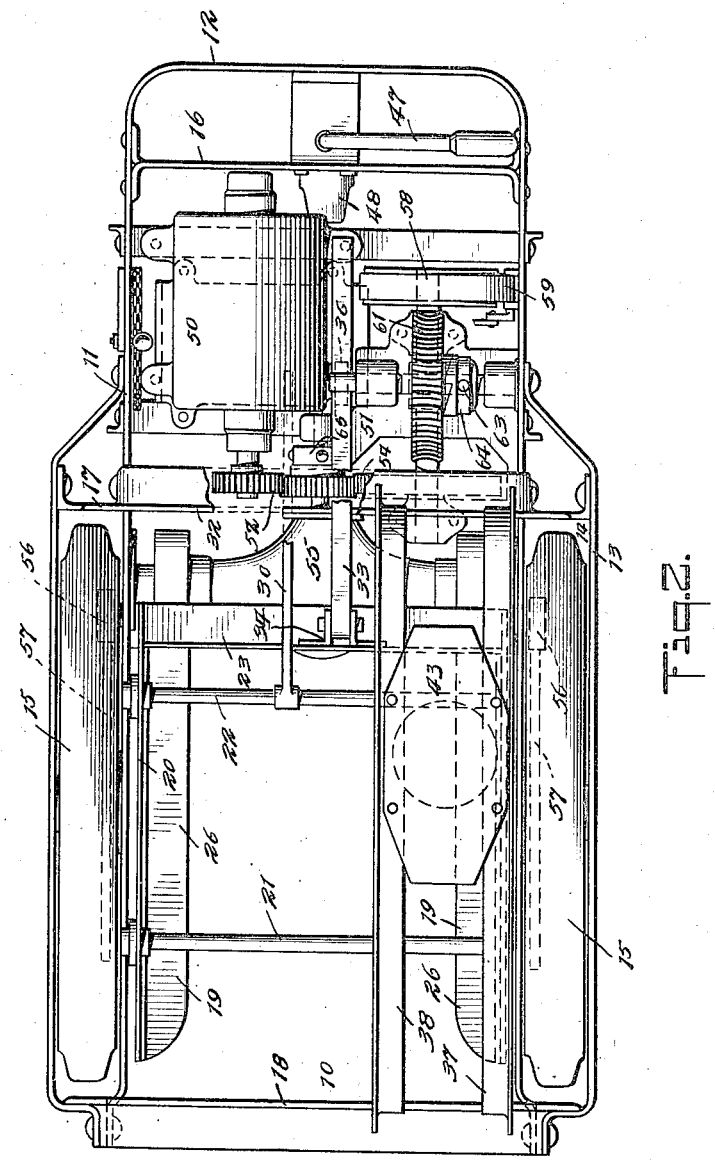
WITNESSES:
INVENTOR
Adolph A. Thiele
BY
Albert M. Austin
ATTORNEYS

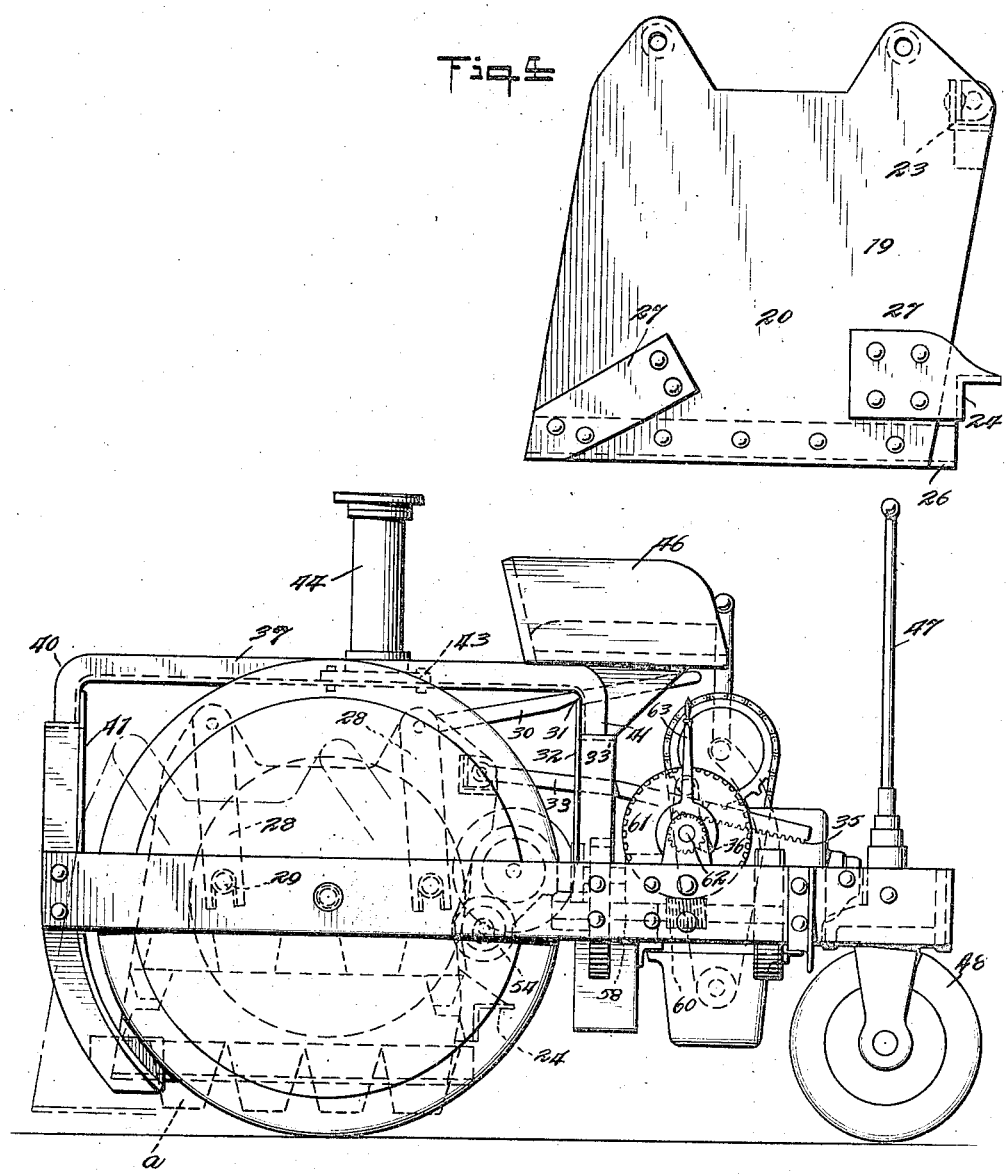

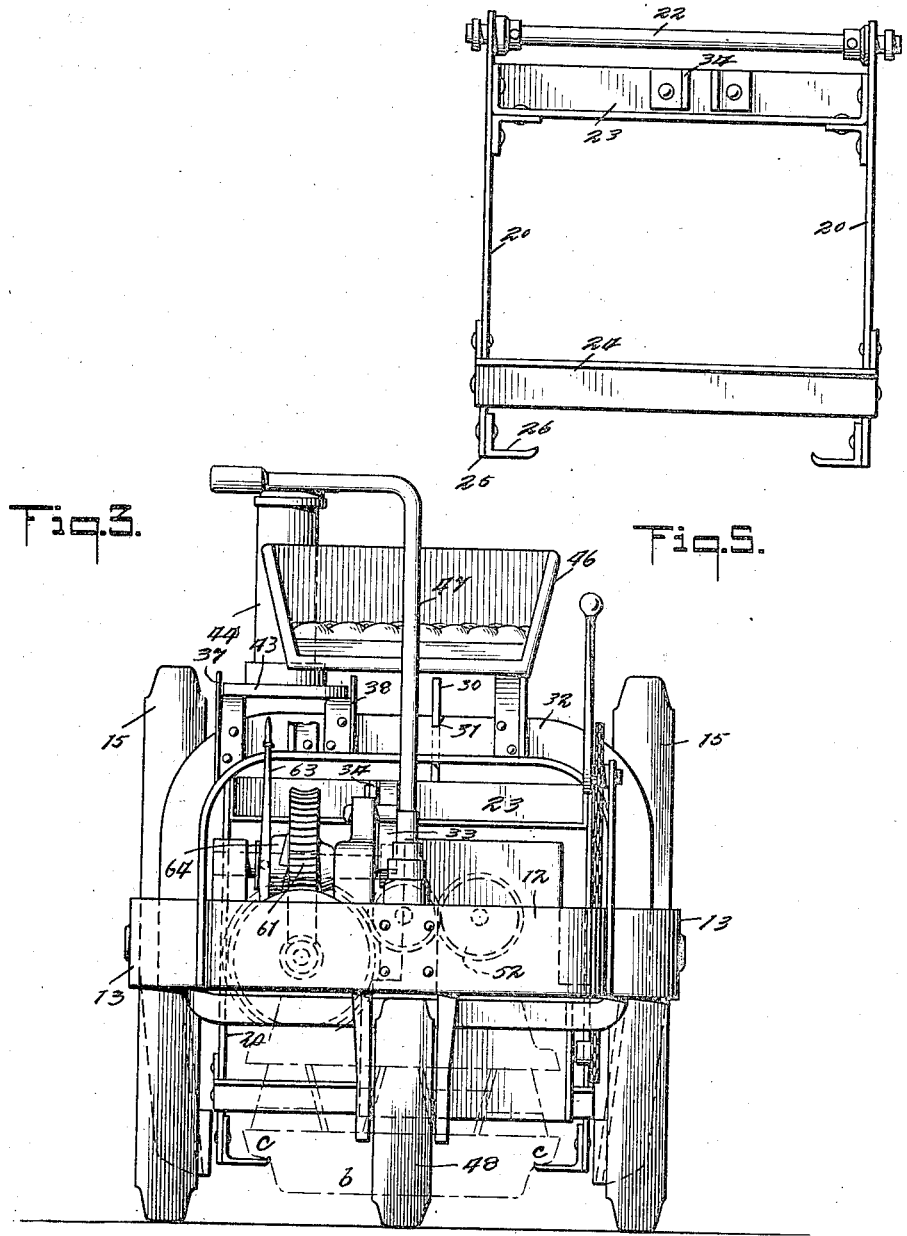

Patented Aug. 21, 1923.

1,465,457

UNITED STATES PATENT OFFICE.

ADOLPH ARTHUR THIELE, OF OMAHA, NEBRASKA, ASSIGNOR TO AMERICAN SMELTING AND REFINING COMPANY, OF NEW YORK, N. Y., A CORPORATION OF NEW JERSEY.

POWER-DRIVEN LEAD TRUCK.

Application filed March 10, 1920. Serial No. 364,853.

*To all whom it may concern:*

Be it known that I, ADOLPH ARTHUR THIELE, a citizen of the United States, and resident of Omaha, in the county of Douglas and State of Nebraska, have invented certain new and useful Improvements in Power-Driven Lead Trucks, of which the following is a specification.

The invention relates to a power driven truck particularly designed for use in metallurgical plants for the purpose of transporting heavy bars or plates of metal and the like over short distances. In such plants there are formed certain conventional forms of bars of lead and other metals which are handled with difficulty. One form of these bars is shown at $a$ in end elevation in dotted lines in Figure 1 and in side elevation at $b$ in Figure 3 which figure also shows the bars provided with end supporting ledges $c$. These bars will hereinafter be designated as bullion bars but the expression is to be construed as referring to any body which is so heavy that it has to be handled with machinery.

One of the objects of the invention is to provide a simple form of truck which will be of relatively light openwork structure but which will have the material thereof disposed and arranged to provide a rugged structure capable of raising and carrying a bank of the bullion bars from place to place economically and with the least power consumption for driving the truck and for elevating the bullion the distance necessary from the ground.

Featuring economy in weight and size of structural parts, the invention contemplates the designing of a small electrically driven truck of the trolley type rather than a truck having its own power plant.

Accordingly, another object of the invention is to provide a form of electrically driven trolley truck, which will have dimensions sufficiently small to permit the truck to make a complete turn in a standard box car during the operation of depositing three rows of standard sized bullion bars in such a car and at the same time have a power sufficient to handle the bars at a distance from the source of electric energy.

Incidental to this general object the invention contemplates the utilization of a flexible trolley connection with a relatively fixed source of electric supply for the truck propelling and bullion elevating mechanism carried by the truck.

Another object of the invention is to provide, in connection with a truck of the class outlined, a single power plant which can be used selectively to drive the truck at relatively high speed and which can be coupled selectively through suitable speed reducing transmission means to supply the necessary power to elevate the heavy bullion loads.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:—

Figure 1 is a view in side elevation showing a preferred embodiment of the invention operatively connected to an overhead trolley track for supplying electric energy to the truck element of the disclosure;

Figure 2 is a top plan view looking down upon the truck element disclosed in Figure 1 and with the parts broken away to show normally hidden structure;

Figure 3 is a view in front elevation of the showing in Figure 1;

Figure 4 is an enlarged detailed view in side elevation of the box element of the elevator shown in dotted outlines in two positions in Figure 1; and Figure 5 is an end view of the complete elevator box looking at the same from the right hand side of Figure 4.

In the drawings and referring particularly to the truck element of the disclosure there is shown a powerful three wheel trolley truck which is relatively short compared to trucks now in general use. The truck is so designed as to provide a relatively short turning radius for the truck when it is operating in a close space, such as a box car. The frame includes a horizontally disposed chassis 10 which includes a pair of side sills 11, formed of a relatively deep plate connected across the front of the truck to form a bumper plate 12. Each side sill 11 is provided on the outer side thereof with a vertically disposed plate 13 constituting a girder 13 and spaced from the rear portion of the sill to form a wheel containing space 14. Opposite ends of the girder are inset and fastened to the side sills and coact therewith to form side frames on opposite sides of the truck. This construction provides a chassis which is relatively wide at its rear portion so as to provide ample space for the elevator hereinafter described and is relatively narrow at the front portion which contains the driving mechanism as is usual in conventional forms of power driven trucks.

The truck is provided with a pair of relatively large rubber tired driving wheels 15 each of which are journalled in the side frames and are pivotally mounted to and between each side sill and its adjacent girder. The side sills are connected in rear of the plate 12 by means of a forward transom 16 and the side frames are connected at opposite ends by means of rear transom members 17 and 18. It will thus be understood that the chassis is rigidly braced horizontally, is supported directly on the axles of the driving wheels and provides a clear space between the wheels to accommodate the elevator 19.

The elevator includes a pair of oppositely disposed side plates 20 connected at their upper portions by a pair of pivoting rods 21 and 22 and connected along their front portions by means of an upper channel iron 23 and a lower channel iron 24, the latter of which is spaced above the lower edges 25 of the plates 20. The lower edges of each of the plates 20 are defined by an inwardly extending angle member 26 which constitutes a supporting ledge designed to engage under the extensions c on the bullion bars to raise the same as the elevator is lifted. The elevator is reinforced on opposite sides thereof by suitable gusset plates 27. A pair of lifting links 28 are pivotally connected to the outer ends of each of the rods 21 and 22 and have their lower ends forked and straddling inwardly extending rollers 29 carried by the side sills on the inner face thereof. These lifting links are so proportioned that in rocking the elevator from the light line dot and dash position, shown in Figure 1, into the heavy line dash position the bullion bars engaged by the flanges 26 are lifted from the ground a distance sufficient to clear any of the usual obstacles which may be in the path of travel of the truck. The elevator is locked in its raised position by means of a locking arm 30 which has its rear end pivotally connected to the forward rod 22 and is provided on its underside with a notch 31 which is designed to engage the upper edge of a yoke 32 connecting the side sills in advance of the transom 17. The elevator is raised by means of a draft rod 33 pivoted to the ears 34 on the connecting member 23 and provided on its underside with a rack 35 in mesh with an actuating pinion 36.

For the purpose of bracing the chassis vertically and longitudinally and to provide a support for a trolley hereinafter described, a pair of transversely spaced apart inverted U-shaped yoke members 37 and 38 have their vertically extending upright ends 40 fixed respectively at opposite ends to a rear yoke 41 and to the forward yoke 33'. The horizontally extending channel portions 42 of the yoke members 37 and 38 are connected together and braced horizontally by a filler plate 43 which constitutes the base plate for trolley post 44.

It will thus be seen that the four yokes coact to form a well braced super-structure connected at front and rear with the chassis by means of the yokes 33 and 37. The yoke 33' provides a support for the operator's seat 46. The seat is positioned conveniently to the steering handle 47 connected to a single steering wheel 48 at the front of the truck, convenient to the several power controlling handles constituting part of the truck propelling mechanism and convenient to the several power plant controlling clutches, hereinafter described.

The power plant includes an electric motor 50 hung on a frame 51 positioned between the side sills at the narrow, forward portion of the chassis and is connected through a speed reducing gear train 52 with a gear driving connection 54, one of the gears of which is connected to the conventional form of power transmission contained within the box 55. The final driving shaft of the transmission terminates at opposite ends of the box in pinions 56 which engage in an internal gear 57 formed on each of the driving wheels to propel the vehicle as is known in conventional forms of differential power transmission connections with tractor wheels. The gear train 54 leads to a brake drum shaft 58 which leads to a brake drum 59 of conventional form and has positioned thereon a worm 60 which engages a worm wheel 61 on the clutch shaft 62. This shaft is designed to be connected through a face clutch 64 with the pinion 36 so that, when the clutch handle 63 is thrown in one direction, a driving connection is provided between the motor and the pinion 36 to draw the rack 35 slowly in a left-to-right position as shown in Figure 1. By this means the motor slowly raises the elevator from the lowermost light dot-and-line-position to the heavy dash position shown in Figure 1. By means of a clutch 65 the gear train 54 may be disconnected from the transmission and in this way all of the power from the motor may be utilized solely for the purpose of lifting the elevator with its load, or in the alternative the motor may be allowed to run idle when both the clutches 64 and 65 are out.

In operation and with the elevator empty, the truck can be driven to the stack of bullion bars as is usual in the driving and control of trolley trucks. The truck can be backed over the tier of bullion bars and by releasing the locking lever 30, the ledges 26 can be caused to move longitudinally under the line of projection c on opposite ends of the bars. When in position under the requisite number of bars the clutch 63 can be thrown in a direction to cause the motor to drive the reducing gear connection and to draw the rack 30 forwardly thus swinging the elevator on its lifting links as previously described and slightly and slowly elevate the tier of bullion bars. The notch 31 on the locking arm will automatically engage its stop plate when the elevator has been sufficiently raised, after which the operator can throw the clutch manually or by any suitable connection the clutch can be thrown out of driving engagement automatically by the moving of the locking arm, or other parts carried by the elevator, when the bullion bars have been elevated the requisite distance off the ground. The clutch 63 can then be thrown into driving engagement and the motor can then be utilized solely to drive the truck to the place where it is desired to deposit the load of bullion bars. For instance, the truck can be driven into a box car, the flexible connection with the trolley permitting the truck to go into the car while maintaining its connection with the source of electric supply. The clutch 63 may again be actuated a distance sufficient to permit the disengagement of the locking arm, after which the elevator may be allowed to fall gravitationally thus depositing its load of bullion bars. More preferable, the motor may be reversed thus gradually lowering the elevator with its load and thus eliminating the shock of the falling weight. The elevator is lowered beyond the point where it deposits the ledges 26 to escape the bars and the truck is then driven either forwardly or backwardly a distance sufficient to permit the elevator to clear the deposited bars.

It is understood that by means of a device of the character outlined it is possible to handle the heavy bullion bars herein suggested and at the same time to provide a skeleton form of truck which will be relatively light and yet which is sufficiently strong to stand the rough usage to which a device of this character is placed. The parts are so balanced that the heavy weight of the load is carried almost directly on the heavy driving wheels and at the same time there is provided a distribution of weight such that the steering wheel can be readily actuated by the manual power of the operator. Effort has been made to design the truck without cumbersome parts and carrying out this thought, the motor is of a high speed, highly efficient, relatively low, power type, dependence being made upon the reducing gear connection to attain the necessary power to raise the heavy weight on the elevator. The parts of the chassis are formed largely of conventional angle iron and special or accurately machined parts have been eliminated as far as possible.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. A truck for carrying heavy bullion and the like comprising a chassis including a pair of longitudinally extending side frames, driving wheels carried by said side frames, a bullion handling elevator positioned within the outlines of the chassis, between the wheels and free to move upwardly to and from the ground and vertically extending links between the elevator and the side sills and means for swinging the elevator on said links to move the same vertically.

2. A truck for carrying heavy bullion and the like comprising a chassis including a pair of longitudinally extending side frames, driving wheels carried by said side frames, a bullion handling elevator positionel within the outlines of the chassis, between the wheels and free to move upwardly to and from the ground and vertically extending links between the elevator and the side sills and means for swinging the elevator on said links to move the same vertically, and means for locking the elevator in raised position.

3. A truck including a chassis provided with side frames, an elevator including oppositely disposed side plates extending vertically above and below said side frames, bullion engaging means on the lower part of each plate, and lifting links pivotally connecting each plate with the adjacent side sill, each of said links extending upwardly from its supporting sill.

4. A truck including a chassis provided with side frames, an elevator including oppositely disposed side plates extending vertically above and below said side frames, bullion engaging means on the lower part of each plate, lifting links pivotally connecting each plate with the adjacent side sill, each of said links extending upwardly from its supporting sill and power means operatively connected to the elevator to swing the same on the links to raise the elevator with its load.

5. A truck including a chassis provided with side frames, an elevator including oppositely disposed side plates extending vertically above and below said side frames, bullion engaging means on the lower part of each plate, lifting links pivotally connecting each plate with the adjacent side sill, each of said links extending upwardly from its supporting sill, a draft bar extending longitudinally of the chassis from the elevator and power means adapted to the operatively connected to the draft bar to draw on the same and thus swing the elevator longitudinally and upwardly on the links.

6. A truck including a chassis provided with side frames, an elevator including oppositely disposed side plates extending vertically above and below said side frames, bullion engaging means on the lower part of each plate, lifting links pivotally connecting each plate with the adjacent side sill, each of said links extending upwardly from its supporting sill, a draft bar extending longitudinally of the chassis from the elevator, power means adapted to the operatively connected to the draft bar to draw on the same and thus swing the elevator longitudinally and upwardly on the links and a locking arm between the elevator and chassis for securing the elevator in raised position.

7. In a bullion truck the combination of an elevator including a pair of side frames each provided adjacent its lower edges with an inwardly extending flange for engaging the bullion, transverse connecting members, upwardly extending lifting links pivoted at their respective upper ends to the elevator for raising and supporting the elevator, power means operatively connected to the elevator for swinging the same on its links to move the same vertically and means for securing the elevator in its raised position.

Signed at Omaha in the county of Douglas and State of Nebraska this 11 day of February, A. D. 1920.

ADOLPH ARTHUR THIELE.